INVENTOR:
MARTIN G. GABRIEL

United States Patent Office 3,302,486
Patented Feb. 7, 1967

3,302,486
DUAL TURBINE HYDROKINETIC POWER
TRANSMISSION MECHANISM
Martin G. Gabriel, Dearborn, Mich., assignor to Ford Motor Company, Dearborn, Mich., a corporation of Delaware
Filed Oct. 31, 1963, Ser. No. 320,258
2 Claims. (Cl. 74—677)

My invention relates generally to hydrokinetic power transmission mechanisms, and more particularly to a multiple speed ratio power transmission mechanism having a pair of hydrokinetic units that may be rendered selectively operable to establish sequentially various transmission speed ratios.

My improved structure can be used readily in an automotive vehicle driveline. It is characterized by a relatively high degree of torque ratio carry-out as the mechanism accelerates from a standing start in the median speed-ratio range. I have accomplished this by using a hydrokinetic fluid coupling as a torque delivery element during operation in a first driving speed ratio and by using a hydrokinetic torque converter mechanism to define in part the torque delivery path during operation in a second driving speed ratio. The turbine of the impeller is connected to one element of the planetary gear system and the turbine of the converter is connected to another element of the gear system.

The provision of an improved hydrokinetic power transmission mechanism of the type above set forth being a principal object of my invention, it is another object of my invention to provide a hydrokinetic power transmission mechanism that is capable of providing a torque ratio of varying magnitude as the speed ratio changes so that the overall operating performance resembles that which may be obtained by means of an infinitely variable drive.

It is a further object of my invention to provide a power transmission mechanism employing a hydrokinetic coupling and a hydrokinetic torque converter in separate power flow paths wherein speed ratio shifts from one ratio to another can be accomplished with a maximum degree of smoothness by appropriately controlling the hydrokinetic units.

It is a further object of my invention to provide a hydrokinetic power transmission mechanism wherein the transverse dimensions of the hydrokinetic portions can be reduced to a minimum. This reduction in space penalty is of particular importance in an automotive vehicle driveline since it then is possible to reduce the size of the indentation or "hump" in the vehicle floor structure which accommodates the transmission housing.

It is a further object of my invention to provide a power transmission mechanism employing a fluid coupling and a hydrokinetic torque converter in combination with a planetary gear system wherein the torque converter is rendered inoperable during low speed ratio operation but is adapted to establish torque multiplication during operation in an intermediate speed ratio. Since the torque requirements of the converter then are not as great as they would be if the converter were used in the driveline during low speed ratio operation, its effective diameter can be reduced thus making possible a reduction in the transverse dimensions of the assembly.

Further objects and features of my invention will become apparent from the following description and from the acompanying drawings, wherein.

Figure 1:
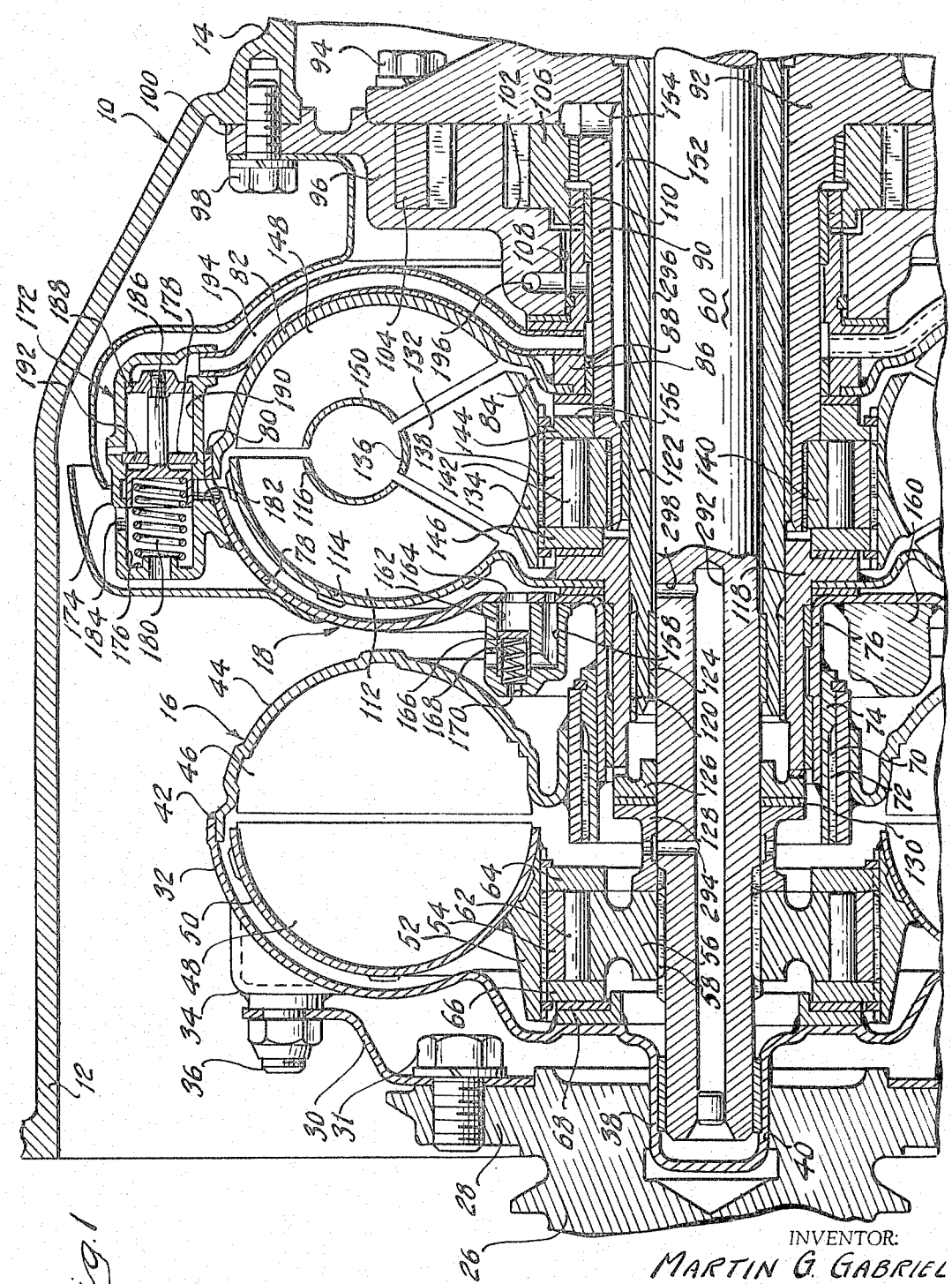
FIGURE 1 shows in cross-sectional form the hydrokinetic portion of a first embodiment of my invention.
Figure 2:
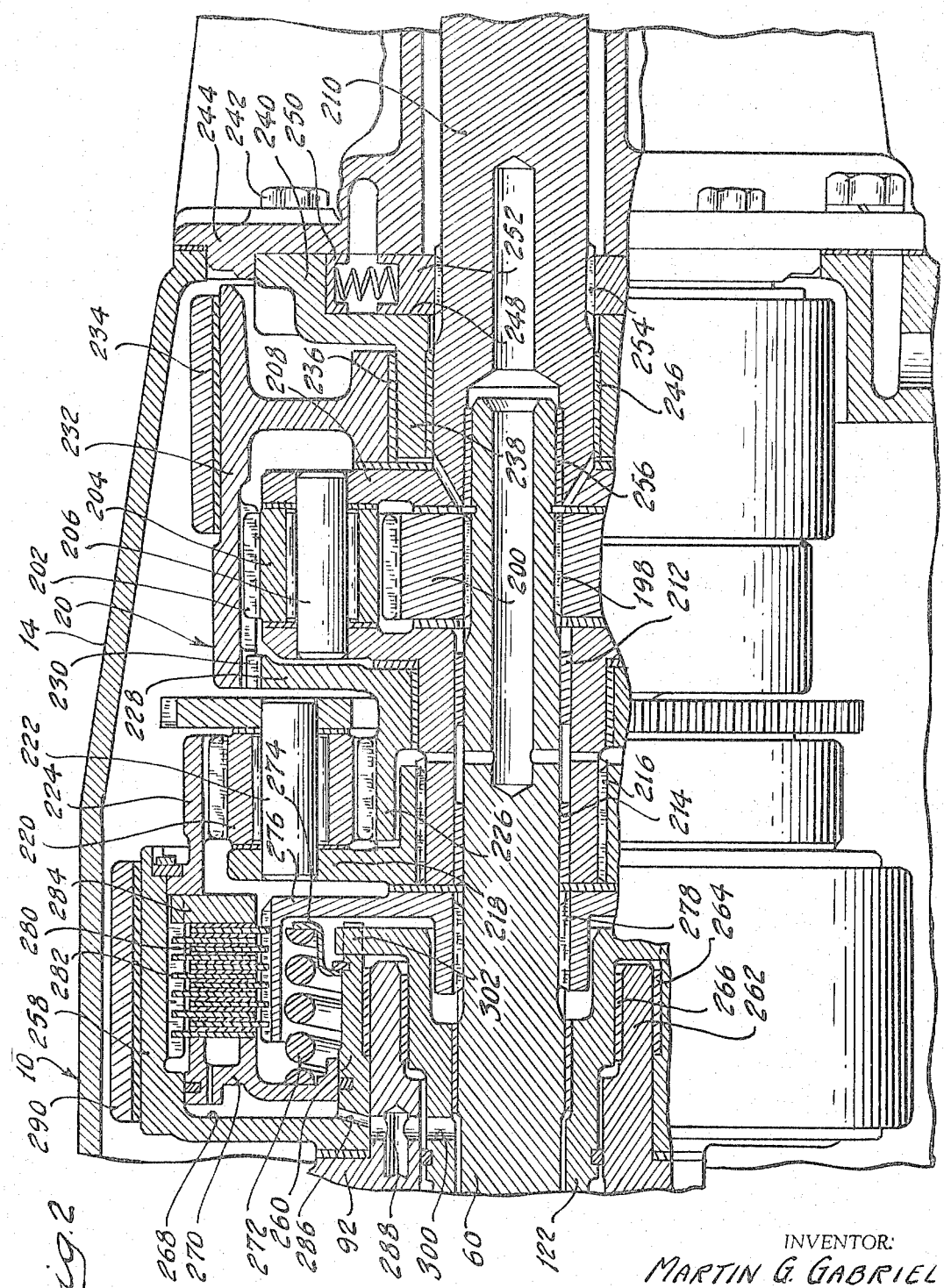
FIGURE 2 shows in cross-sectional form a planetary gear system used with the hydrokinetic portion of FIGURE 1.

Referring first to FIGURES 1 and 2, numeral 10 designates generally a transmission housing. It includes a first housing portion 12 and a second housing portion 14. Housing portion 12 encloses a pair of hydrokinetic units in the form of a fluid coupling 16 and a hydrokinetic torque converter 18. Housing portion 14 encloses a planetary gear system 20.

The peripheral margin of housing portion 12 includes bosses 22 which receive bolts 24. The housing 10 can be joined to the engine block of an internal combustion vehicle engine by means of the bolts 24.

The vehicle engine includes a crankshaft 26 which is flanged at 28 to permit a bolted connection with a drive plate 30. Suitable bolts 31 are provided for this purpose. The radially outward margin of drive plate 30 is connected to an impeller shell part 32, a suitable boss 34 on shell part 32 and studs 36 being provided for this purpose.

The radially inward portion of shell part 32 is formed with a hub 38 which is received within a pilot opening 40 formed in the end of crankshaft 26. The outer periphery of shell part 32 is welded at 42 to a second impeller shell part 44. Impeller blades 46 are secured within the shell part 44 to define radial flow passages.

A bladed turbine 48 is situated in juxtaposed fluid flow relationship with respect to the impeller and is located within the shell part 32. It includes a turbine shroud 50 within which are secured turbine blades that define radial flow passages. Shroud 50 is connected to an internally splined hub 52 within which is carried an externally splined clutch race 54. An inner overrunning clutch race 56 is splined at 58 to a turbine shaft 60 that extends axially in concentric disposition with respect to the coupling 16. Overrunning coupling elements in the form of rollers 62 are disposed between the races 54 and 56. One of the races can be cammed to establish a one-way clutching action between the shaft 60 and the turbine 48.

Spacer rings 64 and 66 are disposed on either side of the races 54 and 56 and are held axially fast by snap rings as indicated. A thrust washer 68 is situated between the spacer ring 66 and the hub of shell part 32. Impeller shell part 44 is formed with a hub 70 which is splined at 72 to a sleeve 74. The sleeve is connected in turn to the hub 76 of an impeller shell part 78 for the torque converter unit 18. The outer periphery of shell part 78 is welded at 80 to shell part 82 for the torque converter unit 18. The hub 84 of the torque converter 18 is joined to a hub member 86 which in turn is piloted by means of bushing 88 upon a relatively stationary sleeve shaft extension 90. This shaft extension forms a part of an adapter 92 which is bolted by means of bolts 94 to a separating wall 96. This wall divides the interior of housing portion 12 from the interior of housing portion 14. It is bolted by means of bolts 98 to an internal shoulder 100 formed within the housing 10.

Wall 96 defines a pump chamber 102 within which are positioned positive displacement gear pump elements 104 and 106. Hub member 86 is received within an opening 108 in the wall 96 and is keyed at 110 to the pump element 106 which functions as a driving member for the pump.

The torque converter 18 includes a turbine 112 having an outer shroud 114 within which are secured radial flow turbine blades. These blades cooperate with the shroud 114 and an inner shroud 116 to define radial flow passages. Shroud 114 is secured to a turbine hub 118 which in turn is splined at 120 to a turbine sleeve shaft 122. This shaft is journaled by means of a bushing 124 upon the shaft 60. The sleeve 74 and the hub 76 for the shell part 78 are journaled upon the hub 118. A thrust element 126 is keyed to the end of the hub 118. A spacer 128 is carried by shaft 60 and a thrust washer 130 is disposed between spacer 128 and the thrust element 126.

Torque converter 18 includes a bladed stator 122 having a first shroud 134 and a second shroud 136. Shroud 134 is formed with an internally splined central opening within which is secured an externally splined overrunning brake race 138. An internally splined brake race 140 is connected to an externally splined portion of the stationary sleeve extension 90. Overrunning brake elements in the form of rollers 142 are situated between races 138 and 140. One of the races can be cammed to permit one-way braking action between the races thereby inhibiting rotation of the stator 132 in one direction while permitting freewheeling motion in the direction of rotation of the impeller.

Spacer rings 144 and 146 are secured by means of snap rings within the shroud 134. Turbine 112 is disposed within shell part 78. It is disposed in juxtaposed fluid flow relationship with respect to the impeller, which is identified in FIGURE 1 by reference character 148. The impeller includes blades that are secured to the interior of shell part 82. These blades cooperate with the shell part 82 and an inner shroud 150 to define radial outflow passages.

The torus cavity of the torque converter 18 can be filled by means of a converter fluid feed passage 152 which is formed in sleeve shaft extension 90. It communicates with a control pressure passage 154 formed in the adaptor 92. This passage in turn communicates with a radial port 156 formed in spacer 144. Port 156 communicates with the interior of the converter torus cavity.

The flow return path for the converter fluid includes the space between shell 78 and the shroud 114. This space communicates with a passage 158 formed in annular boss 160. This boss has formed therein an exhaust valve chamber 162, the end of which communicates with the space between shell part 78 and shroud 114 through the relatively large orifice 164. An exhaust flow valve 166 is movably mounted within chamber 162 and is urged normally in a right-hand direction by valve spring 168. The left-hand end of the chamber 162 communicates with the exhaust region through an exhaust port 170.

The flow passage 158 provides a resistance to fluid flow so that when the torus cavity of the conduit 18 is fed with converter fluid through passage 152, a pressure will be developed when the cavity is filled. This pressure is sufficient to urge the valve 166 in a left-hand direction thereby blocking communication between passage 158 and exhaust port 160.

The torus cavity of converter 18 can be emptied by means of an exhaust valve indicated generally by reference character 172. It includes a circular valve body 174 secured to the periphery of shell part 78 and 82. Body 174 has formed therein a valve chamber 176 within which is positioned a sliding valve element 178. The valve element 178 is urged normally in a right-hand direction as viewed in FIGURE 1 by a valve spring 180.

An exhaust ports 182 communicates with chamber 176 at one location and another exhaust port 184 communicates with the valve chamber 176 at a location spaced from the port 182. When the valve element assumes the position shown, communication is interrupted between the ports 182 and 184.

Valve element 178 includes a valve stem 186 which carries a piston 188. This piston is slidably received within the cylinder 190. A separating wall 192 separates cylinder 190 from the valve chamber 176, the stem 186 being slidably received within an opening formed in wall 192.

A fluid pressure passage in the form of a tube 194 communicates with the cylinder 190 on the right-hand side of the piston 188 as viewed in FIGURE 1. This tube 194 is secured to the outer surface of the shell part 82 and extends radially inwardly to the hub 86. An opening is formed in hub 86 for receiving the radially inward end of the tube 194. The annular space between sleeve shaft extension 90 and the surrounding hub 86 defines a flow passage which is in fluid communication with a pressure signal passage 196 formed in the wall 96. This passage 196 forms a part of an automatic control system and pressure may be admitted to the tube 194 by means of the passage 196 when it is desired to empty the torus cavity of the converter 18. As tube 194 becomes pressurized, valve element 178 will be shifted in a left-hand direction thereby providing an exhaust flow path for the fluid within the torus cavity. Valve spring 168 urges the valve element 166 in a right-hand direction to permit ambient air to flow from the surrounding cavity within the housing portion 12 to the interior of the converter torus cavity thereby replacing the exhausted fluid.

Shaft 60 extends axially through the gear system 20 and is splined at 198 to a sun gear 200 of a first planetary gear unit. This gear unit includes a ring gear 202 and a plurality of planet pinions 204 that are journaled upon pinion shafts 206. These shafts in turn are supported by a planetary carrier 208. Carrier 208 in turn is connected directly to power output shaft 210.

Carrier 208 is journaled by means of bushings 212 and 214 upon the shaft 60. It is splined at 216 to carrier 218. Planet pinions 220 are journaled upon pinion shafts 222 carried by carrier 218. These pinions form a part of a second simple planetary gear unit that includes also a ring gear 224 and a sun gear 226. The sun gear is formed with a radial flange 228 which is keyed at 230 to a brake drum 232. The ring gear 202 is connected to or formed integrally with the drum 232.

A low and intermediate speed brake band 234 surrounds the drum 232 and it may be applied and released selectively by means of fluid pressure operated servos in a conventional fashion. It may be employed also as a hill brake or coast brake.

Drum 232 is journaled by means of a bushing 236 upon a sleeve extension 238 that forms a part of a pump housing 240. The housing 240 in turn is bolted by means of bolts 242 to an end wall 244. This wall is connected directly to the rear end of the housing portion 14. Carrier 208 is journaled by means of a bushing 246 within the extension 238.

Pump housing 240 defines a pump cavity 248 within which are situated positive displacement pumping elements 250 and 252. Element 252 is splined at 254 to the power output shaft 210. This pump assembly forms a part of the automatic control valve system and supplements the action of the front pump assembly shown in part at 104 and 106.

The right hand end of shaft 60 can be journaled by means of a bushing 256 within a bearing opening formed in the end of shaft 210.

Ring gear 224 is connected directly to a brake drum 258 which includes a hub 260 that is journaled upon an extension 262 formed on the adaptor 92, a suitable bushing 264 being provided for this purpose. Another bushing 266 supports shaft 122 within the extension 262.

Drum 258 defines an annular cylinder 268 within which is slidably positioned an annular piston 270. This piston is urged normally toward a released position by a piston return spring 272 which is anchored by a spring seat member 274 carried by hub 260. A clutch element 276 is splined at 278 to the shaft 60. It is externally splined to provide a connection with internally splined clutch discs 280. These discs are situated in interdigital relationship with respect to externally splined discs 282 which are connected to an internally splined portion of drum 258. A clutch disc backup ring 284 also is splined to the interior of the drum 258 and held axially fast by means of a snap-ring.

Piston 270 is adapted to engage the discs frictionally thereby establishing a direct driving connection between drum 258 and clutch element 276. The piston is actuated upon introduction of fluid pressure to the annular cylinder 268 through a clutch pressure feed passage 286. This passage communicates in turn with a clutch pressure supply passage 288 formed in adaptor 92. This passage forms a part of an automatic control valve system, not shown.

Surrounding drum 258 is a reverse brake band 290 which may be applied and released selectively by means of a fluid pressure operated servo.

To establish low speed ratio operation, it merely is necessary to engage brake band 234 thereby anchoring the ring gear 202 and the sun gear 226. The torque converter torus cavity is emptied by applying an appropriate pressure signal to the piston 188 thereby moving the valve element 178 to the exhaust position. The torus cavity of the fluid coupling 16 is filled by introducing fluid through a central passage 292 formed in shaft 60. This passage communicates with the coupling torus cavity through a port 294, an annular passage 296 and a port 298. Passage 296, which is defined by the space between shaft 60 and the sleeve shaft 122, forms a part of the automatic control valve system. It may be in fluid communication with a port 300 formed in shaft 122 which in turn communicates with control pressure passages in the adaptor 92. Turbine torque from turbine 48 then is delivered through the overrunning coupling shown in part at 62 to the shaft 60. It then is delivered directly to the sun gear 200. Ring gear 202 acts as a reaction member under these conditions and the carrier 208 and the power output shaft 210 then are driven at a reduced speed ratio.

Shaft 122 is keyed at 302 to the drum hub 260. Rotation of the carrier then causes rotation of shaft 122 by reason of the fact that the sun gear 226 is anchored. Shaft 122 is overdriven at the same speed as the speed rotation of ring gear 224, but since the torus cavity of the converter is emptied, the turbine 112 is permitted to freewheel during operation in the low speed ratio range.

To establish a shift from the low speed ratio to the intermediate speed ratio it merely is necessary to exhaust the signal pressure tube 194 thereby blocking the exhaust flow path for the converter torus cavity and simultaneously supplying converter fluid through passage 152. As the converter becomes filled, the turbine 112 receives multiplied engine torque. This torque is delivered to the drum 258 and ring gear 224 by reason of a direct connection between shaft 122 and the drum hub 260. Sun gear 226 acts as a reaction member since brake band 234 remains applied. The carrier 218 then is driven at an increased speed ratio that is greater than the lowest speed ratio but less than unity.

The motion of carrier 218 is transferred to carrier 208 and hence to the power output shaft 210. Sun gear 200 obviously will be overspeeded during operation in the intermediate speed ratio, but this overrunning motion is accommodated readily by the overrunning coupling shown in part at 62. Thus the turbine 48 forms no part of the torque delivery path during intermediate speed ratio operation.

To establish direct drive operation, both hydrokinetic units remain filled and the multiple disc clutch assembly shown in part at 280 and 282 is applied by introducing pressure through the annular cylinder 268. Simultaneously the intermediate and low speed ratio brake band 234 is released in timed sequence with the engagement of the clutch disc assembly. The elements of the planetary gear system thus become locked together for rotation in unison and torque then is delivered hydrodynamically to the gear system and hence to the power output shaft 210.

Reverse drive is obtained by applying brake 290 and filling the fluid coupling torus cavity. Coupling turbine torque then drives sun gear 200 which causes ring gear 202 to rotate in a reverse direction. This reverse motion causes sun gear 226 to rotate in a reverse direction and drive the common carrier and the power output shaft in a reverse direction with the ring gear 224 acting as a reaction member.

Figure 3:
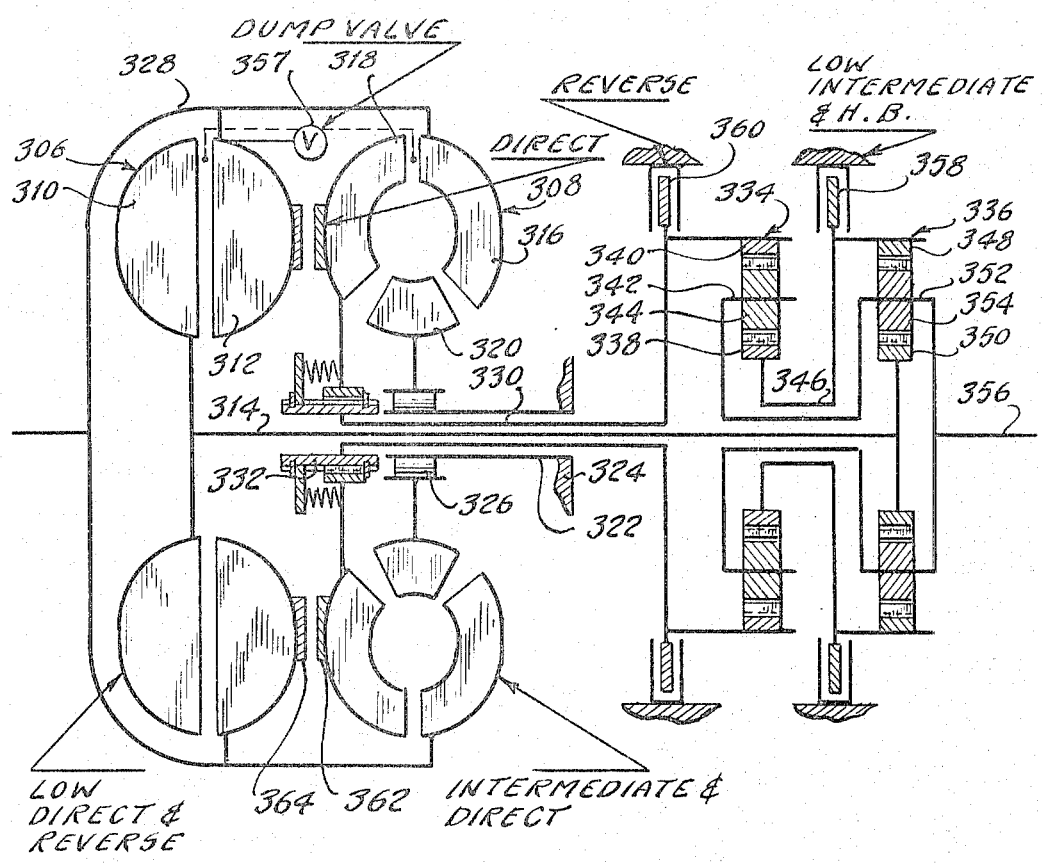
FIGURE 3 shows in schematic form a second embodiment of my invention.

In FIGURE 3, I have illustrated an alternate embodiment of my improved transmission structure. It includes a pair of simple planetary gear units that act in cooperation with a hydrokinetic fluid coupling and a hydrokinetic torque converter to provide three forward driving speed ratios and a single reverse speed ratio. The fluid coupling is identified generally by reference character 306 and the torque converter is shown at 308. The coupling 306 includes a bladed turbine 310 and a bladed impeller 312 which are situated in fluid flow relationship to define an annular torus cavity. Turbine 310 is connected drivably to a central torque delivery shaft 314.

The torque converter 308 includes a bladed impeller 316 and a cooperating bladed turbine 318. The impeller 316 and the turbine 318 are disposed in juxtaposed fluid flow relationship to define an annular torus cavity. A bladed stator 320 is situated between the flow exit region of the turbine 318 and the flow entrance region of the propeller 316. It is mounted upon a stationary stator sleeve shaft 322 which is connected directly to the transmission housing shown in part at 324. An overrunning brake 326 establishes a one-way braking action between the stator 320 and the shaft 322. It permits free-wheeling motion of the stator 320 in the direction of rotation of the impeller 316, but it inhibits rotation of the stator 320 in the opposite direction.

The impeller 312 and the impeller 316 are connected to a drive shell 328 that in turn can be connected drivably to the crankshaft of an internal combustion vehicle engine.

Turbine 318 is drivably connected to a turbine sleeve shaft 330 by means of a sliding splined connection 332. The connection 332 permits limited shifting movement of turbine 318 in an axial direction, but is capable of transmitting turbine torque from the turbine 318 to the shaft 330.

Planetary gear units are identified generally by reference characters 334 and 336. Unit 334 includes a sun gear 338, a ring gear 340, a planetary carrier 342 and planet pinions 344. Planet pinions 344 are journaled rotatably upon the carrier 342. Carrier 342 in turn is connected to a sleeve shaft 346.

The planetary gear unit 336 includes a ring gear 348, a sun gear 350, a carrier 352 and planet pinions 354. Pinions 354 journal upon carrier 352, the latter in turn being connected to the sleeve shaft 346. Carrier 352 is connected drivably to a power output shaft 356. A friction brake 358 is adapted to anchor selectively the ring gear 348 and the sun gear 338. It may be applied and released during low and intermediate speed ratio operation as well as during hill-braking operation by means of a suitable fluid pressure operated servo. Ring gear 340 is adapted to be anchored selectively by a friction brake 360 during reverse drive operation. Like the brake 358, the brake 360 can be applied and released by means of a fluid pressure operated brake servo.

Figure 4:
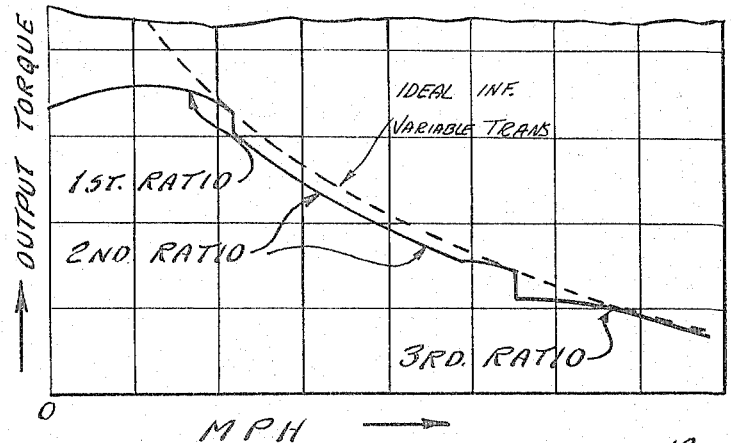
FIGURE 4 shows a performance chart illustrating the characteristics of each embodiment of my invention.

The operating characteristics for each of the embodiments of my invention are illustrated in FIGURE 4 where I have plotted vehicle speed in miles per hour vs. torque applied to the power output shaft. Operation in the first speed ratio is indicated by the symbol "1st ratio," operation in the intermediate speed ratio is indicated by the symbol "2nd ratio" and operation in the high speed direct drive ratio is indicated by the symbol "3rd ratio." It will be observed that the torque converter is utilized for torque multiplication purposes only in the second ratio range. As the torque converter reaches the converter coupling point, a change in slope in the operating performance curve is indicated.

A suitable valve system, indicated schematically by reference character 357, is employed for selectively filling and emptying the coupling 306 and the converter 308. It may be designed to function in a manner similar to the dump-and-fill valve structure described in U.S. Patent No. 3,215,001 (Zundel), which is assigned to the assignee of my invention. Vehicle start-up is accomplished by filling the coupling by means of the valve system 357 and applying the brake 358. Turbine torque then is transmitted to the rear sun gear 350 and multiplied by the gear unit 336 as the ring gear 348 acts as a reaction member. To effect a first ratio to second ratio shift, the fluid coupling 306 is emptied and the torque converter 308 is filled. The friction brake 358 remains applied. Turbine torque from the turbine 318 of the converter 308 then is distributed through the connection 332 and through sleeve shaft 330 to the ring gear 340. Sun gear 338 acts as a reaction member under these conditions and the carrier 342 together with the power output shaft 356 is driven at an increased speed ratio that is greater than the low speed ratio but less than unity.

To establish high speed ratio operation, the coupling 306 is filled while the converter 308 remains filled. Both friction brakes are released. Thus the torque of the turbine 318 is distributed directly to the ring gear 340 while the torque converter 310 is distributed directly to the sun gear 350. This causes the planetary gear system to rotate substantially in unison at a one-to-one speed ratio. To reduce the hydrokinetic slip in the hydrokinetic portions of the mechanism, I have provided a friction clutch structure for connecting directly the turbine 318 to the impeller 312. This clutch structure can be applied with a delayed action following an upshift from the intermediate speed ratio to the direct drive ratio.

This direct drive clutch structure is comprised of a friction disc 362 carried by the outer shroud of turbine 318 and by a cooperating friction disc 364 carried by the outer shroud of the impeller 312. Impeller 318 is axially slidabile by reason of the splined connection 332 and it can be urged to a clutch engaging position by appropriately controlling the magnitude of the circuit pressure in the torus cavity of either the coupling 306 or the converter 308. This establishes a direct mechanical connection between the engine crankshaft and the ring gear 340.

Reverse drive is obtained by releasing brake 358 and applying brake 360. The fluid coupling 306 is filled and the converter 308 is emptied. Turbine torque then is delivered from turbine 310 through shaft 314 to the sun gear 350. This tends to rotate ring gear 348 and sun gear 338 in a reverse direction and the carrier 352 tends to be driven in a forward driving direction. Carrier 342, however, tends to be driven in a reverse direction and since ring gear 340 is anchored, the net result of the opposed moments applied to the common carrier tends to cause the shaft 356 to rotate in a reverse direction.

Having thus described the preferred embodiments of my invention, what I claim and desire to secure by U.S. Letters Patent is:

1. A hydrokinetic power transmission mechanism adapted to deliver driving torque from a driving member to a driven member, a pair of simple planetary gear units, each gear unit comprising a ring gear element, a sun gear element, a carrier element and planet pinions rotatably journaled upon said carrier element in meshing engagement with said sun and ring gear elements, brake means for selectively anchoring one element of each gear unit, another element of one gear unit being connected to said driven member, a hydrokinetic torque converter unit comprising an impeller and a turbine disposed in a common torus circuit in fluid flow relationship, a hydrokinetic fluid coupling comprising a turbine and an impeller disposed in a common torus circuit fluid flow relationship, said impellers being connected to said driving member, a first connection between said coupling turbine and a first power input element of said gear units, a second connection between a second power input element of said gear units and the turbine of said converter, said converter being adapted to be filled and emptied to establish and interrupt a hydrokinetic torque delivery path between its associated power input element and said driving member whereby a speed ratio shift can be accomplished hydrokinetically, said coupling being adapted to be filled with fluid to establish low speed ratio operation when said converter is emptied and said converter being adapted to be filled to establish intermediate speed ratio operation when said fluid coupling is emptied, both the fluid coupling and the converter being filled to establish direct drive operation, and friction clutch means for connecting directly together the turbine of said converter and the impeller of said fluid coupling for rotation in unison thereby reducing the hydrokinetic slip under torque delivery conditions.

2. In a hydrokinetic power transmission mechanism adapted to deliver driving torque from a driving member to a driven member, a pair of simple planetary gear units, each gear unit comprising a sun gear, a ring gear, a carrier and planet pinions rotatably journaled upon said carrier in meshing engagement with said sun gear and ring gear, said carriers being connected together for rotation in unison, said carriers being connected to said driven member, a hydrokinetic fluid coupling comprising an impeller and a turbine disposed in toroidal fluid flow relationship in a common torus circuit, a hydrokinetic torque converter comprising an impeller and a turbine disposed in toroidal fluid flow relationship in a common torus circuit, said impellers being connected to said driving member, the coupling turbine being connected to the sun gear of a first of said planetary gear units, the ring gear of said first planetary gear unit being connected to the sun gear of the second of said planetary gear units, brake means for anchoring selectively the ring gear of said first planetary gear unit and the sun gear of said second planetary gear unit to establish low speed ratio and intermediate speed ratio operation, a direct, mechanical connection between the turbine of said converter and the ring gear of the second of said planetary gear units, reverse brake means for anchoring selectively the ring gear of said second planetary gear unit to establish reverse drive operation, said coupling being adapted to be filled during low speed ratio operation and third speed ratio operation and emptied during intermediate speed ratio operation, said converter being adapted to be filled during intermediate speed ratio operation, and selectively engageable friction clutch means comprising friction elements connected to the turbine of said converter and to the impeller of said fluid coupling, the friction elements being adapted to be engaged to establish a low slip driving condition during operation of said mechanism in the high speed ratio range.

References Cited by the Examiner

UNITED STATES PATENTS

| | | | |
|---|---|---|---|
| 2,352,004 | 6/1944 | Pollard | 74—677 |
| 2,368,873 | 2/1945 | Pollard | 74—688 |
| 2,829,542 | 4/1958 | Swennes | 74—688 |
| 2,899,844 | 8/1959 | Hattan | 74—688 |
| 3,084,568 | 4/1963 | O'Malley | 74—761 |
| 3,217,562 | 11/1965 | Stockton | 74—677 |

DAVID J. WILLIAMOWSKY, *Primary Examiner.*

THOMAS C. PERRY, *Examiner.*